Nov. 4, 1969   P. J. MANTLE ET AL   3,476,069
MULTIPLE HULL VEHICLE WITH AIR CUSHION SUPPORT
Filed Jan. 24, 1967   9 Sheets-Sheet 1

INVENTORS
PETER J. MANTLE &
ARNOLD M. HALL
BY William C. Everett
their ATTORNEY

INVENTORS
PETER J. MANTLE &
ARNOLD M. HALL
BY William C. Everett
their ATTORNEY

INVENTORS
PETER J. MANTLE &
ARNOLD M. HALL
BY William C. Everett
their ATTORNEY

United States Patent Office 3,476,069
Patented Nov. 4, 1969

3,476,069
MULTIPLE HULL VEHICLE WITH AIR CUSHION SUPPORT
Peter J. Mantle, Gales Ferry, and Arnold M. Hall, Noank, Conn., assignors to General Dynamics Corporation, New York, N.Y., a corporation of Delaware
Filed Jan. 24, 1967, Ser. No. 611,355
Int. Cl. B63b 1/34, 1/38
U.S. Cl. 114—67          21 Claims

ABSTRACT OF THE DISCLOSURE

An air cushion vehicle is provided with buoyant and/or planing hulls positioned toward the rear of the craft and with an air cushion containing skirt positioned around the front of the craft forward of the planing hulls. The hulls may be faired back to the rear of the vehicle or may cut off before the rear of the vehicle leaving only thin skegs to seal the cushion at the sides on the rear end. A third buoyant and/or planing hull may be positioned at the bow of the vehicle, either in front of, or in back of, the flexible skirt, or with the flexible skirt attached to it near its center.

---

The present invention is directed to a novel air cushion vehicle and more particularly to an air cushion vehicle having combined buoyant and planing hulls and an air cushion containing skirt at the front thereof.

In the general field of water surface traveling vehicles it has long been desired to increase the speed at which these vehicles are capable of traveling. Conventional ships have good performance efficiency at low speeds but rapidly lose efficiency as speed increases because of hull resistance. Any improvement in hull shape to reduce resistance results in a hull shape that is subjected to high slamming loads. Even the fastest conventional craft rarely can travel above 30 knots, and conventional planing craft which travel at greater than hump speed are increasingly subject to severe pitch and heave problems, which at speeds above 50 knots can be sufficient to upset the craft entirely. Sustained oscillations of pitch and heave are set up, known as porpoising. Vehicles employing the air cushion, or surface effect, have been designed in an effort to produce greater efficiency at higher speeds and at the same time to counteract the severe pitch and heave problem. These surface-effect vehicles have a major disadvantage in being subject, to a very high degree, to excessive yaw and sideslip when attempting to make a turn at high speeds. What results is that the boat will turn sideways but will continue to travel for a considerable distance in the same direction as before. Moreover, unless a very large air rudder or side thruster is provided, the vehicle will be extremely difficult to turn at all. In an effort to solve the problem of yaw in a surface-effect vehicle, the sidewall vehicle was produced, having two sharp skegs at the sides of the craft and movable baffles at the front and rear of the craft to hold a region of higher pressure. This vehicle provided the efficiency of the surface-effect vehicle combined with, to a certain extent, a solution to the problem of turning control and yaw. However, it was found that at high speeds the sidewall craft had a disastrous tendency to roll over in a turn. This roll instability was discovered to be due to the fact that as the water hits the skeg on the outboard side of the turn, it applies a torque moment to the craft at a point below its center of gravity. Since this has a tendency to cause the craft to roll, the craft will lean out of the turn. This, in turn, would cause the skeg on the outboard side of the craft to dip deeper into the water and increase the torque moment, thereby causing an increase in the roll. This effect tends to increase until the craft rolls entirely over.

The surface-effect vehicle according to the present invention overcomes these disadvantages while retaining the overall advantages of both the surface-effect vehicle and the sidewall craft, and provides a craft that combines the high efficiency hydrodynamic ship form at low speed with the high efficiency airborne surface-effect vehicle at high speeds, yet maintains both a stable and controllable planform. To this end the present invention provides a surface-effect vehicle having an air cushion containing skirt attached around the front and forward sides with two hulls having buoyant and planing lift characteristics on the sides of the vehicle aft of the skirt. The skirts in the forward part of the vehicle act as a shock absorber for waves, which inhibits or completely removes the tendency of waves to cause a craft to pitch up. The planing hulls at the rear of the vehicle provide not only resistance to yaw, but provide centers of lift back of the center of gravity of the craft as a whole, which centers of lift tend to move backwards on the vehicle as the speed of the vehicle is increased. Since the center of pressure of the vehicle's air cushion is forward of the center of gravity, this means that the center of gravity of the vehicle is contained, or encompassed, within a triangular support formed by the center of pressure and the two centers of lift of the planing hulls. As the speed of the craft increases, the planing surfaces will ride higher, thereby causing the two back points of this triangle to shift backwards, and tending to cause the craft to point its nose down. This tendency to point the nose down will counteract the natural tendency of the craft to pitch up. Moreover, since the front of the craft is supported by the air cushion contained by the flexible, shock absorbing skirt, the effect is that of a giant dash pot at the front end of the craft, which will tend to dampen out any tendency of the craft to fall into oscillations of pitch and heave, or porpoising, common to high speed planing craft. A variation of the basic design is to put steps into each of the planing hulls providing for a think skeg back of a certain point on each hull. This preserves the resistance to yaw and roll instability and the air cushion sealing means, but tends to concentrate the center of planing lift in a more forward position and in particular permits a more level trim in the static or displacement mode. In addition, the elimination of the planing hulls at the very rear of the vehicle further decreases the turning moment around the center line and thereby further decrease the tendency of the craft to pitch forward.

A further variation of the invention is provided by having a hull under the bow of the vehicle which may optionally be located in any one of three positions. In the first embodiment the skirt is positioned entirely forward of the bow hull, and the function of the bow hull is to provide improved buoyancy trim in the static mode while preserving the shock absorbing and damping characteristics of the air cushion and skirt at higher speeds (above hump speed). In the second embodiment, the hull is located entirely forward of the skirt and acts to absorb shock in a generally triangular structural network, which minimizes racking loads of the type which are experienced by sidewall craft which have side hulls extending the length of the craft. In this mode, the skirt will perform the function of the air cushion support for the vehicle but will not bear the brunt of the waves. Nonetheless the positioning of an air cushion toward the front of the craft will continue to provide the dash pot effect damping mechanism which tends to eliminate pitch and heave oscillations in the basic concept. In the third embodiment, the bow hull has attached to it on each side at approximately its mid-point the forward edges of two side skirts, and the hull and the two skirts together with the aft planing hulls form the sealing means for the air cushion. The second and third embodiments, where the bow hull is forward of the skirt, are generally usable only for lower speeds, as notwithstanding the damping effect of the air cushion, the wave impact on the bow hull structure will cause some tendency to pitch up.

For those craft according to the present invention which are intended to be operated at low speeds, the optimum hull length is greater than half the craft length. Such an increase in length provides better trim characteristics in the static or low air cushion pressure mode and obviates the third or forward hull.

For those craft according to the present invention which are intended to be operated primarily at higher speeds, the optimum hull length will be less than half the craft length. In this case, the craft will be traveling essentially on its air cushion with only the very back surface of the two hulls extending into the water to provide steerage and an improved degree of yaw and roll stability compared to a pure air borne air cushion vehicle. It will also trim properly in the zero or low air cushion pressure mode by the use of buoyancy distribution and the third or forward hull when it is resting on the surface.

It is accordingly the object of this invention to provide a surface-effect vehicle which combines a forward skirt with aft planing hulls, having high stability in pitch, yaw, and roll combined with the efficiencies of an air cushion vehicle.

It is also an object of this invention to provide a surface-effect ship in which the forward skirt provides a camping mechanism to minimize porpoising.

It is yet another purpose of this invention to provide a surface-effect ship in which the loads on the ship are supported in a generally triangular structural network to minimize racking loads.

It is yet another object of this invention to provide a surface-effect vehicle which may operate at optimum efficiency and pitch, roll, and yaw stability at a wide range of speeds, from the low, or displacement, mode to the high speed planing mode.

It is still another object of the invention to provide a craft with lower total power requirements then a conventional ship for the same displacement and speed.

Other objects of the invention will become obvious from the following description when taken together with the drawings in which.

Figure 1:
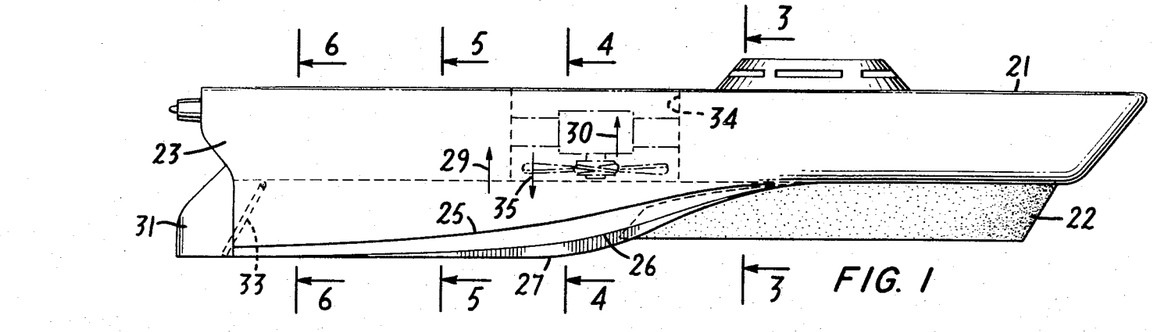
FIG. 1 shows a side elevation of a surface-effect vehicle constructed according to the present invention.
Figure 2:
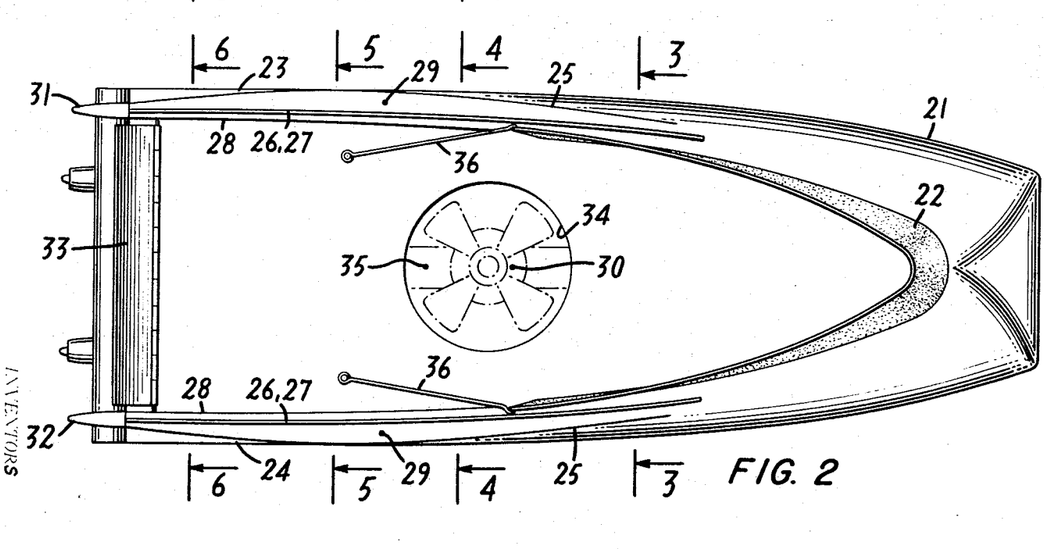
FIG. 2 shows an elevation taken from the bottom of the vehicle shown in FIGURE 1.

Referring now to FIGURE 1, the basic hull configuration may be seen in a planform 21, having a skirt 22 attached to its underside from approximately the halfway point forward. The skirt 22, which is generally of flexible, rubberized fabric or the like, is suspended so as to form at its forward end a part conic section, and extends backwards on both sides to attach to the inside walls of a pair of planing hulls 23, 24. Skirt 22 may attach directly or by a tether 36 allowing a degree of freedom. As shown in FIGURES 1 and 2, each planing hull has an outer chine 25, a keel 26, a skeg 27, and an innerchine 28. As may be seen from FIGURES 3 through 6 in conjunction with FIGURES 1 and 2, the outer chine 25 on each side is the line of breakage between the planing surface and the more or less vertical side hull. The keel 26 is the bottom point of hull 23. Inserted into each hull 23, 24 at its keel is a skeg 27. Skegs 27 are thin, rigid plates, usually of sheet metal, inserted into the material of the keel and extending down therefrom for a short distance to provide sealing means for an air cushion contained below the bottom of the hull planform 21 itself. This is particularly important in the high speed mode of the vehicle, as during the high speed mode of the vehicle it is traveling along above the surface of the water with only the very rear end of each of the planing surfaces between chine 25 and keel 26 touching the surface of the water. In order to provide, therefore, a seal for the air cushion, which would otherwise leak out excessively, under the bottom of each hull 23, 24 forward of the submerged portion of the hull there is extended down into the water the flat, rigid skeg 27. The bottom line of skeg 27 extends horizontally from the rear end of the vehicle to a point approximately half the length of the vehicle forward, and then moves up as shown in FIGURE 1 to fair with the keel. Since the keel itself is in a constant rise from aft to forward, the length of the skeg below the keel increases toward the front of the vehicle up to a point at which the skeg breaks away from the horizontal line to fair with the keel. Shown on FIGURE 2 are the centers of planing lift 29. These centers 29 are the centers of the force vectors formed by the action of flowing water on the planing surfaces. These centers 29 will be forward at low speeds and will shift aft with increase of speed as the forward part of each planing surface lifts out of the water. Center of pressure 30 is the center of lift of the air cushion underneath the planform of the hull. In general this does not shift with change of speed. The center of gravity 35 is encompassed in a triangle formed by the centers of lift 29 and the center of pressure 30.

Figure 3:
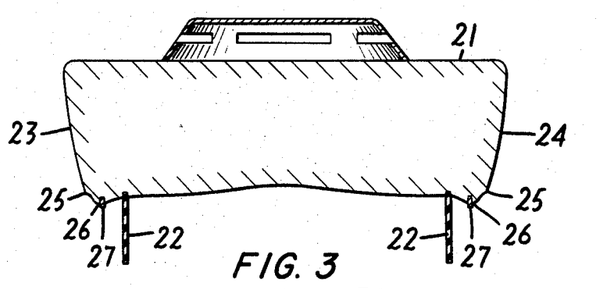
FIG. 3 shows a section of the vehicle taken along the lines 3—3 in FIGURES 1 and 2.
Figure 4:
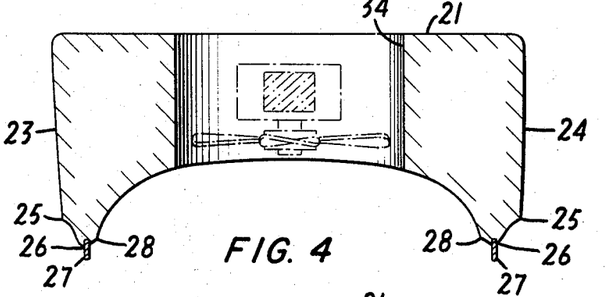
FIG. 4 shows a section of the vehicle taken along the lines 4—4 in FIGURES 1 and 2.

Of particular importance in the design of the planing surfaces between chine 25 and keel 26 is the dead rise angle, which is the angle which the line between the chine and keel in any cross section makes with the horizontal. This dead rise angle, which is quite steep toward the front of the boat, as shown in FIGURE 3, gradually decreases toward the rear of the vehicle until it is quite shallow at the rear end. Consideration of the yaw and roll stability of the vehicle will shown the important of this decreasing angle. As the vehicle goes into a turn, the planing surface on the outer side of the craft, at the turn, is planing not only in the forward direction, but in the sideward direction as well, since the vehicle always encounters some degree of yaw. Since the degree of resistance to travel is proportional to the angle of the dead rise, it is important that the maximum pressure be centered somewhere near the center of the vehicle, as for example at the point at which the cross section in FIGURE 4 is taken. But if the dead rise angle toward the rear of the craft is less, and the dead rise angle is slightly greater toward the front of the vehicle, the effect will be to create several important force vectors. First, of primary importance in preventing rolling of the vehicle, will be a strong upward vector somewhere near the center of the vehicle on the outboard hull in the turn. A second force vector, coincidental with the first one, but directed horizontally into the center of the turn, will cause the vehicle to travel sideways toward the direction in which the craft is turning. The third force vector is a turning moment in the direction of the turn, which tends to cause an increase in the turning angle. The provision of this increase in the turning angle tends to counteract the resistance to turning which the vehicle naturally possesses as a result of having its hulls 23 and 24 positioned at the rear. Since the hulls are positioned at the rear, there is little danger of the vehicle going into a skid with its rear end rotating around its front, as conventional surface-effect vehicles are sometimes prone to do.

Also shown in FIGURE 1 are rudders 31, 32 attached to the rear ends, respectively, of hulls 23, 24. Also shown in FIGURES 1 and 2 is a flap 33 for providing a rear end seal for the air cushion underneath the vehicle. Suitable means, not shown, may be provided for propelling the vehicle. To be preferred are either air or water jets attached to the side hulls 23, 24 of the vehicle, or an air propeller to be mounted on the top rear of the vehicle. A water screw extended from the underside of the boat down into the water may also be used, but this screw is not preferred, as it has several drawbacks. For one thing, the application of force to the craft at such a low location increases to a great degree of the tendency of the vehicle to pitch up. Secondly, such a screw rotates at maximum efficiency only within a very small range of speeds, and does not operate efficiently in the high range of speed above 50 knots. Such a screw will also interfere to a large extent with the operation of the vehicle in areas which are essentially watery but filled with plant life and other debris, as in a swampy area. It should be noted here that the vehicle, although primarily designed for open water, will also traverse swampy, plant filled areas with its sharp bottom skegs and planing hulls.

In FIGURES 1 and 2 is also shown a center hole 34 in the hull planform 21, within which is positioned a fan which rotates to force air downward into the area under the hull planform 21, to maintain the air cushion which partially supports the vehicle. This fan is rotated by conventional means not shown here.

The hulls 23, 24 in FIGURES 1 and 2 are shown as essentially parallel, but it will be understood that they may either toe in or toe out instead as design considerations for a particular range of speeds and mode of travel dictate.

Figure 5:
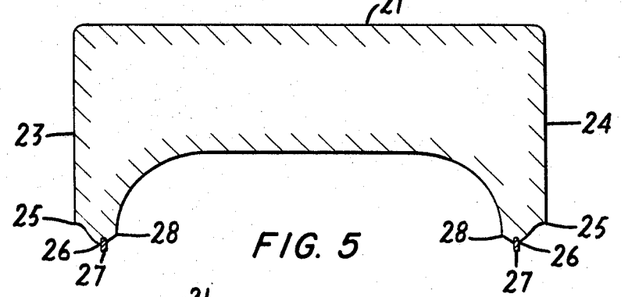
FIG. 5 shows a section taken along the lines 5—5 in FIGURES 1 and 2.
Figures 5A, 7, 8A, 8E:
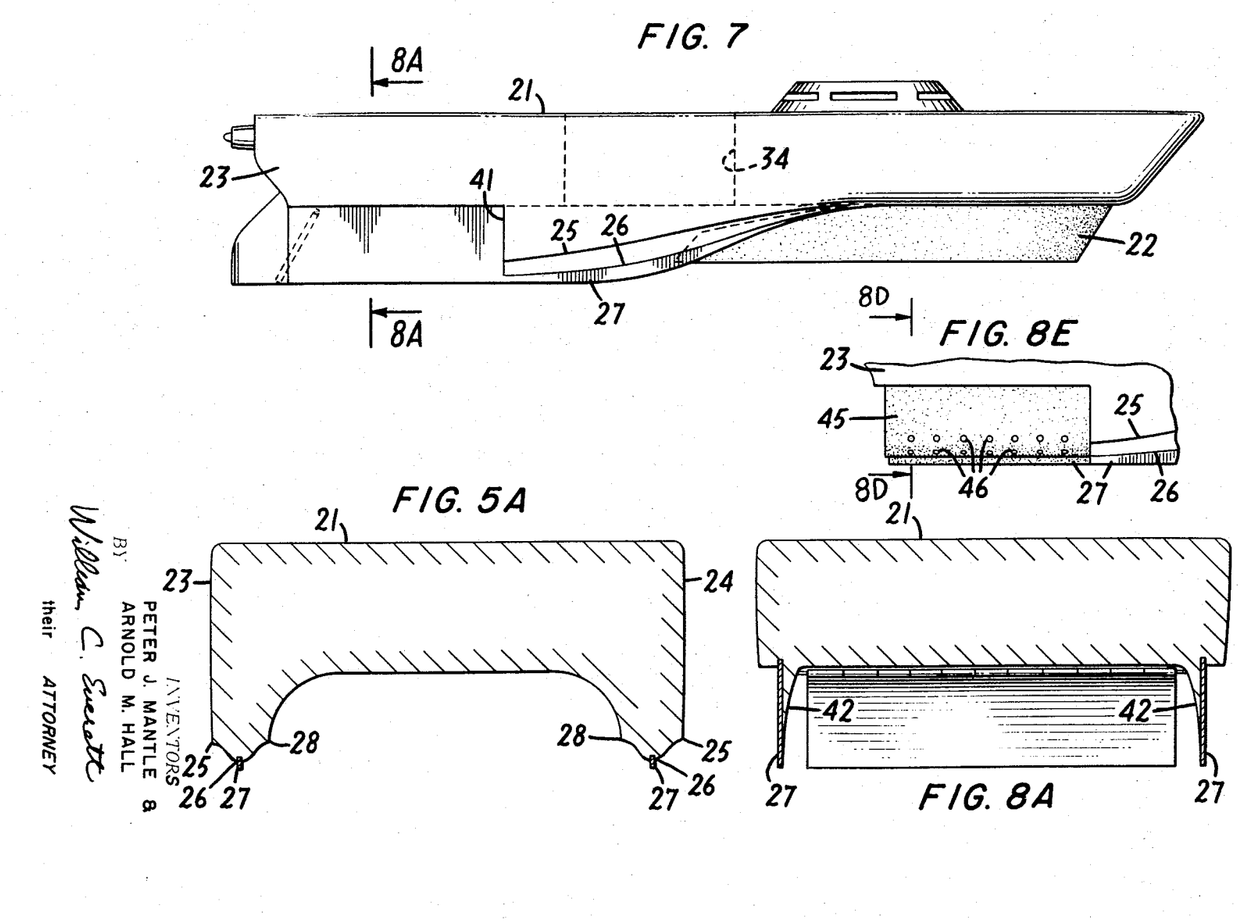
FIG. 5a shows a section taken along the lines 5—5 in FIGURE 1 showing an alternate embodiment according to the invention.
FIG. 7 shows a side elevation of a vehicle according to the invention showing another alternate embodiment according to the invention.
FIGS. 8a through 8d show four alternate embodiments according to the invention taken along lines 8—8 in FIGURE 7.
FIG. 8e shows a partial side view of the embodient of FIGURE 8d.
Figure 6:
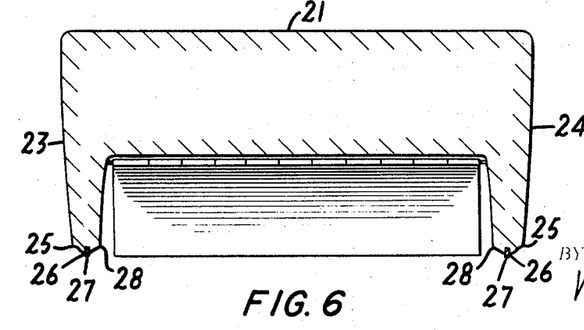
FIG. 6 shows a section taken along the lines 6—6 in FIGURES 1 and 2.

In FIGURE 5a there is shown a variation of the section on lines 5—5, FIGURE 1, in which each of the hulls 23, 24 have symmetrical planing surfaces inside and outside the hull; i.e., the planing surface between chine 25 and keel 26 is identical in shape to the planing surface between chine 28 and keel 26. This results in the net planing lift force vector on each of the two hulls being directed more nearly in a vertical plane (except insofar as the water level under the planform is lower due to the hydrostatic head caused by the air cushion pressure) instead of at an angle inwardly, as will be the case in the embodiment shown in FIGURES 3 through 6. Such a change in force vectors, besides relieving the central of hull of certain stresses on it, will also cause a larger net lift vector on each of the two hulls. It also has the effect of making available a greater volume for buoyancy lift in the static mode. It also reduces the total planform area for the air cushion and results in a transfer forward of the center of air pressure 30. This may or may not be desirable, depending on the particular range of speed desired and the performance characteristics of the vehicle desired. In general it is to be preferred for lower speeds.

Although the hulls 23, 24 are shown as occupying approximately one half of the length of the craft, it may be extended to two-thirds or more of the craft length for vehicles that are intended to travel primarily at lower speeds. Such an increase in length results in better trim characteristics in the static or low air cushion pressure mode of travel. The length of the hulls may also extend to only the back one third of the vessel, or less, for vessels designed to travel primarily at high speeds. When this is the case, the vehicle will be traveling essentially on its air cushion with only the very back edge of the two hulls extending into the water to provide steerage and a modified degree of yaw and roll stability. Such a craft will trim properly in the low air cushion pressure mode, as the body planform in case of low or no air cushion is shaped for proper distribution of buoyancy when it is resting on the surface. It will be understood that such a craft primarily designed for high speed travel will still travel efficiently at low speeds.

FIGURE 7 shows a variation of the side hull construction in which each of the two side hulls is cut back at line 41, leaving a bare skeg 27 extending up to the bottom of the planform proper. FIGURES 8a through 8d show various constructions of side skegs extending down from planform 21 aft of line 41. It will be understood that the construction of hulls 23, 24 forward of line 41 is as shown in FIGURES 1 through 6. In the embodiment of FIGURES 8a, skegs 27 are, as before, sheet metal, extending down from hull planform 21 and backed by slightly faired sections 42 at their upper end to provide normally efficient aerodynamic performance within the air cushion supported area.

Figure 8B:
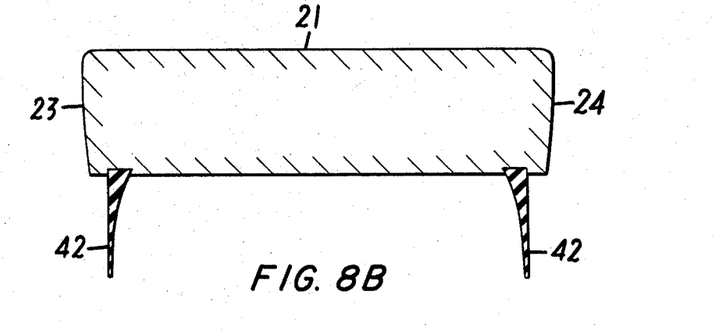

FIGURE 8b show a section of an embodiment in which there are skegs 42 which are vertical on their outer sides and faired on their inner sides and composed of rubber or some other natural or synthetic semi-rigid material, such as polyethylene or the like. This embodiment offers the advantage of greatly reduced rear end resistance, especially in a turn; thereby contributing even more to the lessening of resistance to turn previously noted. It must be noted in this embodiment that the rubber skegs in general will not be strong enough to support rudders, and there will therefore be required separate supporting and controlling means for a rudder assembly at the rear end of the boat, not shown.

Figure 8C:
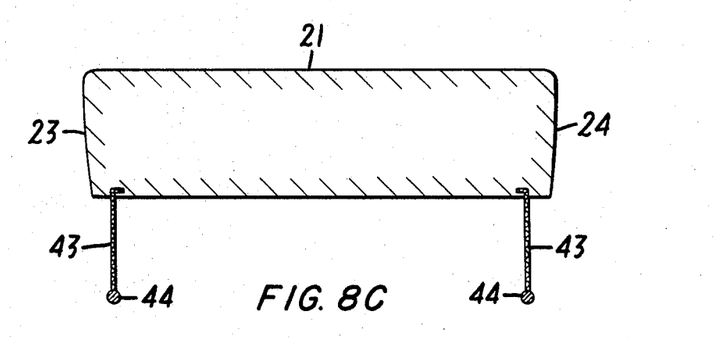

In FIGURE 8c, the third embodiment is shown, which uses skegs 43 of cloth sheets bound at their lower ends by rigid members 44. Rigid members 44 may be connected rigidly to the rear ends of the hulls 23, 24 at line 41, or they may be hinged so as to move freely. One purpose, as before, of this embodiment is to offer decreased resistance in the turning mode and to provide a concentration of the planing lift in an area more nearly centered in the center of the vehicle length. However, it must be noted that the cloth sheets of FIGURE 8c will luff at high speeds and will offer increased aerodynamic and hydrodynamic drag and are therefore desirable only for the lower speeds.

Figure 8D:
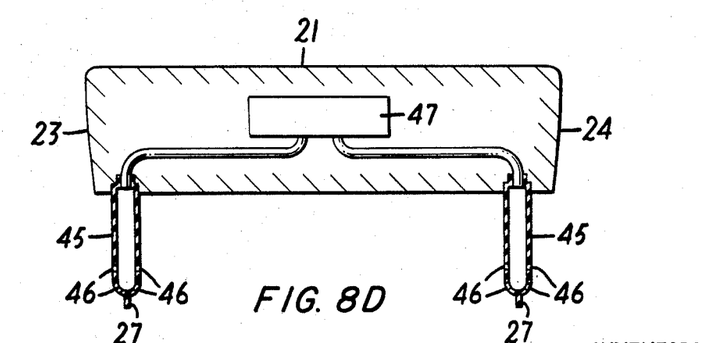

In FIGURE 8d is shown another embodiment for the section along lines 8—8 in FIGURE 7 in which there are skegs 45 comprising inflated narrow rubber or polyethylene bags. These bags will be inflated by a source of air pressure 47 contained within the hull planform 21. This source of air pressure may be separate from the source of pressure for the air cushion so that the pilot of the vehicle can make the rear skegs more rigid or more flexible as conditions over which he is traveling may dictate. Inflated bags 45 are shown with bleed holes 46 at their lower ends, the purpose of which is to provide air lubrication for the portion of the bags 45 which contact the water. This feature has the advantage of providing decreased hydrodynamic drag at the rear end of the vehicle where the skegs trail in the water. However, it requires the maintenance of a continuing source of air flow separate from the central fan and may therefore be eliminated if this is not considered advisable.

Figure 9:
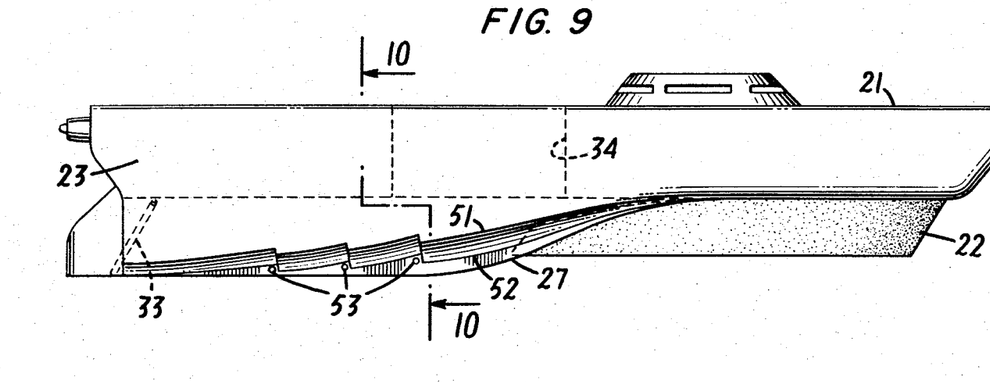
FIG. 9 shows a side elevation of a vehicle according to another embodiment of the invention.
Figure 10:
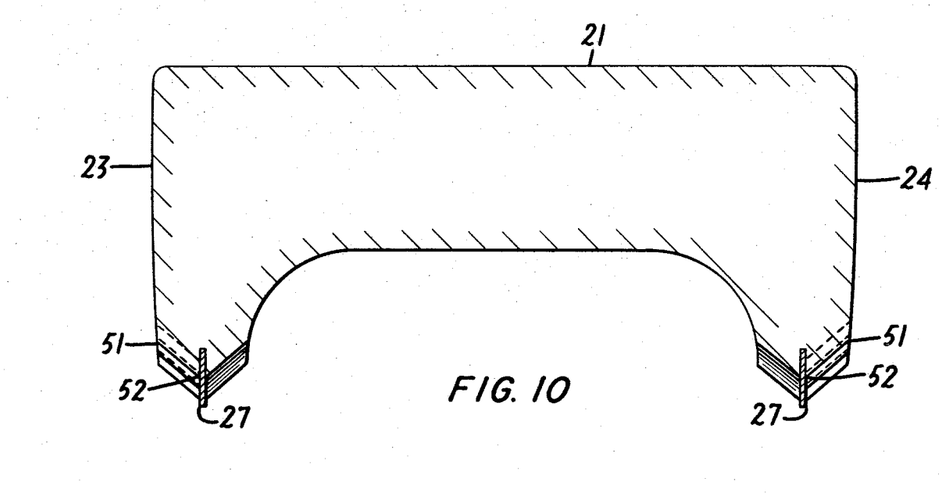
FIG. 10 shows a part section taken along lines 10—10 of FIGURE 9.

In FIGURE 9 is shown another embodiment of the vehicle in which each of the hulls 23 has a stepped outer chine 51 and keel 52 with the result that the planing surfaces therebetween are stepped. Behind each step there may be a hole 53 in the skeg 27 communicating with the air cushion to add air lubrication to each planing surface. This is further illustrated in FIGURE 10, showing a part section along the lines 10—10 of FIGURE 9 in which can be seen the several successive steps to the rear of line 10—10. This embodiment produces a lower wetted surface of the planing surfaces and consequently less hydrodynamic drag. On the other hand, it also produces less planing lift and is therefore, to be considered primarily for vehicles in the moderate to higher range speeds, i.e., above 40 knots.

Figure 11:
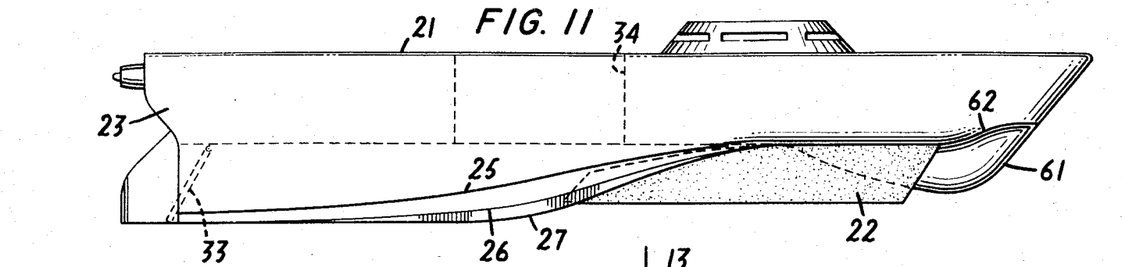
FIG. 11 shows a side elevation of a vehicle showing another embodiment according to the invention.

In FIGURE 11 is shown another embodiment of a surface-effect vehicle according to the invention in which the design of the planing hulls 23 are as in FIGURES 1 through 6, but in the bow of the craft there is a hull extension 61 extending down to a little less than the bottom of skegs 27. Hull 61 joins planform 21 at chine 62. In this embodiment, the force of the waves will be supported by a triangularly shaped structure composed of hull 61 and hulls 23, 24. This triangular structure largely eliminates racking loads experienced by vehicles having an essentially rectangular structure, as in a conventional sidewall craft. Skirt 22 is attached on each side of hull 61 and around its bottom and extends aft to connections similar to that of FIGURES 1 and 2. In this embodiment, the shock absorbing qualities of the skirt are partially sacrificed for forward buoyancy. The buoyant hull 61 will cause the craft shown in FIGURE 11 to have excellent static and low cushion trim. However, it will be subject to heavy shock loads at higher speeds, and consequently this embodiment is designed for low to intermediate speeds. However, due to the air cushion immediately behind the forward hull, the tendency to porpoise, or oscillate by pitch and heave, will as before be largely damped out.

Figure 12:
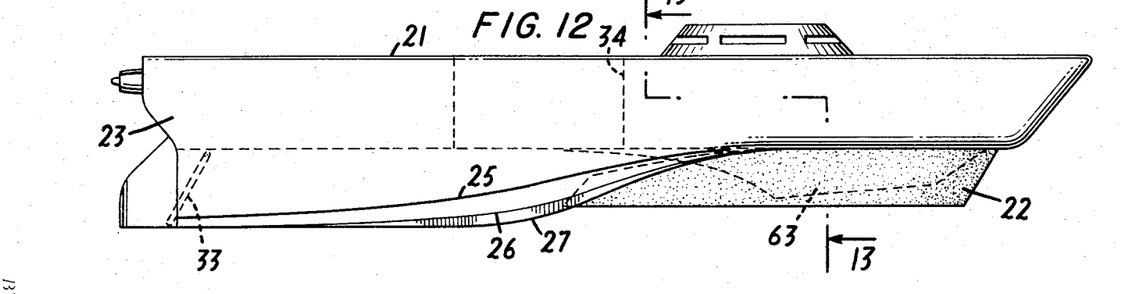
FIG. 12 shows a side elevation of a vehicle according to a further embodiment of the invention.
Figure 13:
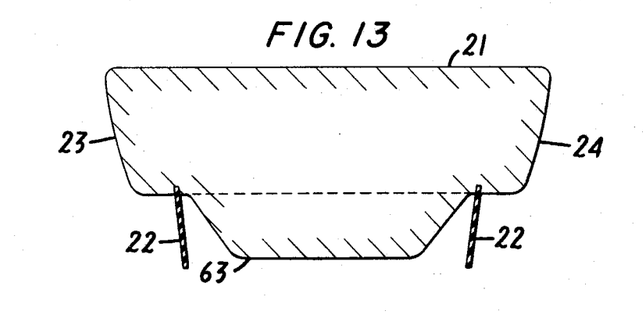
FIG. 13 shows a section taken along lines 13—13 of FIGURE 12.

In FIGURE 12 is shown another embodiment which uses a forward buoyancy hull, but without the loss of the shock absorbing qualities of the skirt 22. In this embodiment, the buoyancy hull 63 is positioned under the planform 21 in back of the forward skirt 22. As shown more completely in FIGURE 13, the buoyancy hull 63 is a large volume, flat hull which is not intended to take any of the forward shock of the traveling vehicle at higher speeds but provides a forward point of buoyancy support in the static and low air cushion mode. With the air pressure higher, in the higher speed modes, skirt 22 will stand out from hull 63, shielding it. In the low air cushion mode, at lower speeds, the skirt 22 will lie back flat against hull 63 and planform 21. Hull 63 is hydrodynamically shaped for efficient travel at low speeds, and to be compatible with the skirt contour when the skirt 22 is lying back against it. The lateral sides of hull 63 are warped surfaces, i.e., they cut flat lines in any section, but with a decreasing dead rise angle toward the rear, so that skirt 22 may lie flat when deflected back. Due to the shielding of hull 63 which is substantially shorter than skirt 22, this embodiment is not subject to the sharp loads of the embodiment of FIGURE 11 and is therefore susceptible to travel at higher speeds.

Figure 14:
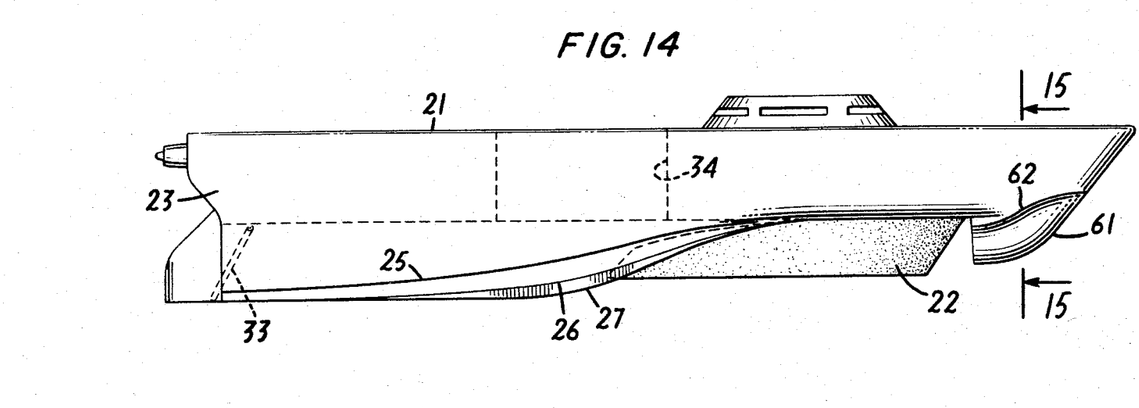
FIG. 14 shows a side elevation of a vehicle according to yet another embodiment of the invention.
Figure 15:
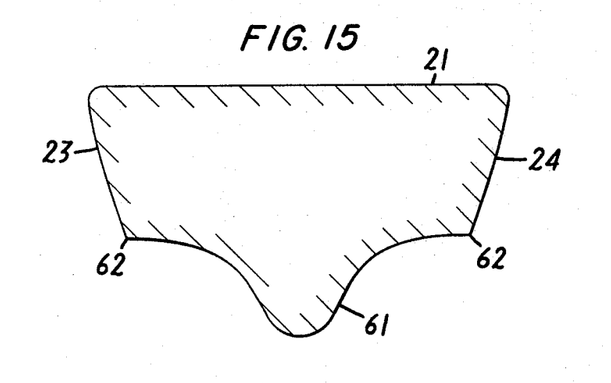
FIG. 15 shows a section taken along lines 15—15 of FIGURE 14.

In FIGURE 14 is shown a variation on the embodiment of FIGURE 11. In this embodiment, as shown more fully in the sectional view of FIGURE 15, the forward hull is shorter than skirt 22 and entirely forward of it, with the result that skirt 22 comes around completely as before, but this time in back of hull 61. In this embodiment, a portion of the shock is absorbed by skirt 22 and a portion by hull 61. However, since hull 61 is shorter than skirt 22, the boat is able to travel at higher speeds in relatively calm seas, as hull 61 will be for the most part out of the water in the high air cushion mode. As before, the presence of the air cushion immediately behind the hull will have a heavy damping on any porpoising tendencies.

Figure 16:
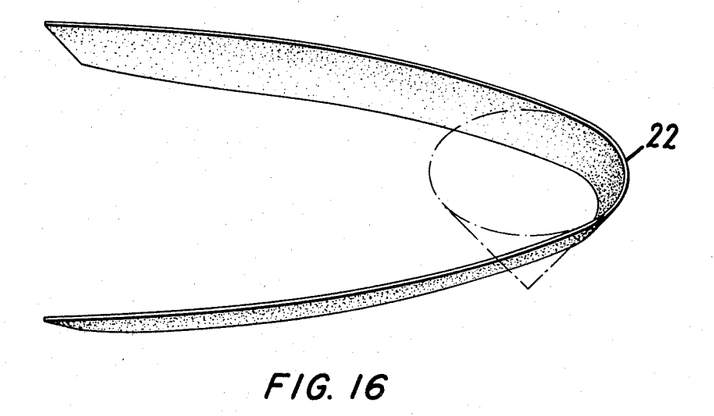
FIG. 16 shows a cutaway view of a skirt according to an embodiment of the invention.
Figure 17:
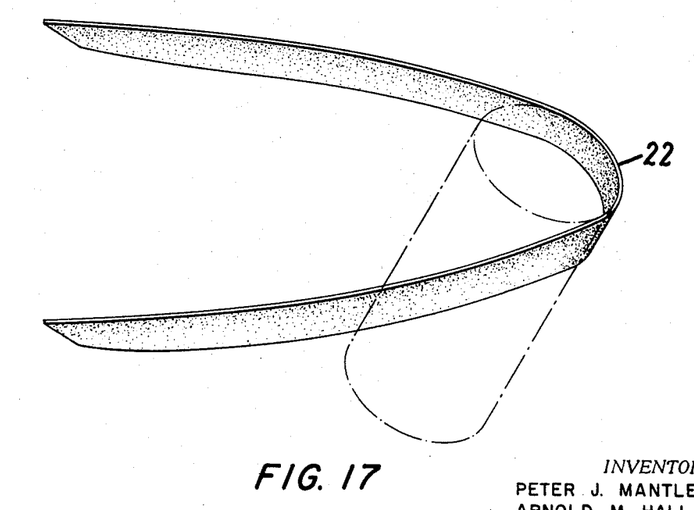
FIG. 17 shows a cutaway view of a skirt according to another embodiment of the invention.

In FIGURES 16 and 17 are shown two possible means of shaping skirt 22. In FIGURE 16 the front of skirt 22 is a partial conic section, as shown by the dotted line indicating a cone. In FIGURE 17 the skirt 22 is shown as a section of a rhomboidal cylindrical surface. The conic section is more shiplike, i.e., better shaped, and less likely to billow, and therefore requires less tension in the skirt to maintain shape. The cylindrical section is more adaptable to twisting out of plane to mate with the aft planing hulls. Both, however, are single curvature surfaces which may be formed from a flat rubberized sheet, which may employ various known synthetic materials therein.

Figure 18:
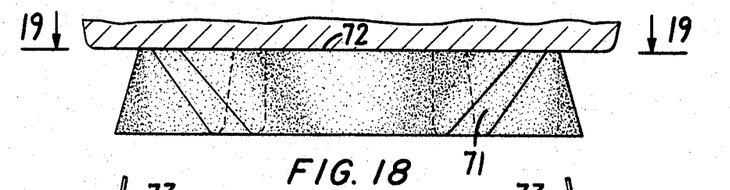
FIG. 18 shows a partial elevation of a skirt according to yet another embodiment of the invention.
Figure 19:
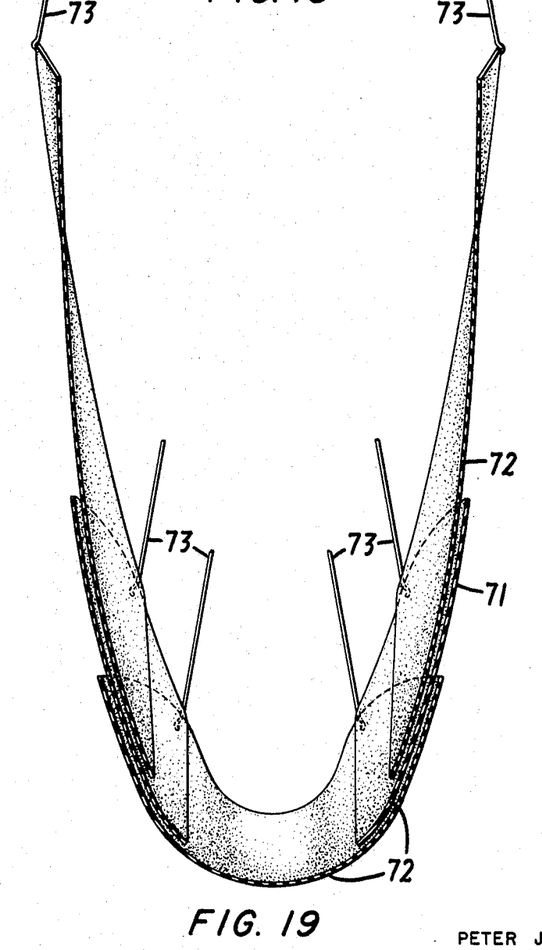
FIG. 19 shows a section taken along the lines 19—19 in FIGURE 18.

In FIGURES 18 and 19 is shown a skirt 71 composed of separate leaves. The leaf 72 in front is supported by its curvature against the air pressure of the cushion and each of the others rests on the one ahead of it. Such a skirt 71 will yield backwards but not forward. Moreover, when it yields, it does not billow as the skirt 22 may under some circumstances. Pieces of the skirt 71 may be held by tethers 73 to prevent breakout under a high air cushion pressure.

From the foregoing it will be seen that there is designed a surface-effect vehicle which is susceptible to use in a wide variety of sea states and at a wide variety of speeds. Although each of the vehicles may be primarily designed for a particular speed range, it must be emphasized that those vehicles which are designed for travel at high speeds with high planing lift and high air cushion will also operate efficiently at lower speeds. They will also, due to their planing hulls, have a tendency to lean in to a curve in a turn, which is the stable condition, but without losing turning ability or resistance to yaw. In particular, the roll stability of the vehicle is assured, thereby preventing tragic roll-overs such as sidewall craft are susceptible to.

It will also be understood that many of the parimeters shown of the vehicle may be varied somewhat without departing from the spirit of the invention. By way of example, but not limitation, the length of the side hulls has been disclosed to vary from one third of the length to two thirds or more. The height of the forward buoyancy hull where used may be higher or lower than shown, and the positioning of the skirt in conjunction therewith may be varied as the needs of hydrodynamic efficiency and marine stability require.

We claim:
1. In a surface effect vehicle having a body planform with a source of air pressure in communication with its underside to provide at least partial lift for said body planform by reaction with a liquid surface, the improvement comprising:
   a pair of planing hulls attached to said body planform at its sides, each of said planing hulls having a center of lift on its planing surface; and
   a flexible skirt attached to said body planform forward of said planing hulls, forming with said planing hulls sealing means for an air cushion supporting said body planform, wherein the center of pressure of said air cushion forms a triangle of support with said centers of lift encompassing the center of gravity of said vehicle.

2. In a surface effect vehicle as recited in claim 1, the further improvement comprising:
a third hull positioned forward of said planing hulls on the underside of said planform.

3. In a surface effect vehicle as recited in claim 2, the further improvement wherein said third hull is aft of said skirt.

4. In a surface effect vehicle as recited in claim 3, the further improvement wherein said third hull has sides comprising warped surfaces having decreasing dead rise angles toward the rear of said third hull.

5. In a surface effect vehicle as recited in claim 2, the further improvement wherein said third hull is forward of said skirt.

6. In a surface effect vehicle as recited in claim 1, the further improvement comprising:
each of said planing hulls extending from the stern of said vehicle forward to a point on the side of said vehicle, said skirt passing around the bow of said vehicle on its underside and extending aft to connect with each of said hulls.

7. In a surface effect vehicle as recited in claim 1, the further improvement comprising:
a thin skeg extending downward from the lower edge of each of said hulls forming in the water a portion of said sealing means for said air cushion.

8. In a surface effect vehicle as recited in claim 1, the further improvement comprising:
said planing hulls terminating at a point short of the stern of said vehicle; and
thin skegs extending on each side of said vehicle from the end of said hulls to the stern of said vehicle and from said planform to the lower edge of said hulls.

9. In a surface effect vehicle as recited in claim 8, the further improvement comprising:
said skegs being formed of a non-metallic semi-rigid material.

10. In a surface effect vehicle as recited in claim 8, the further improvement comprising:
said skegs being formed of a flexible sheet material.

11. In a surface effect vehicle as recited in claim 10, the further improvement comprising:
a rigid extension on the lower edge of each skeg extending from the lower edge of the corresponding hull to the stern of said vehicle.

12. In a surface effect vehicle as recited in claim 8, the further improvement comprising:
each of said skegs being formed of a thin hollow bag in communication with a controllable source of air pressure, whereby the position and stiffness of said skegs can be varied by an operator in operation.

13. In a surface effect vehicle as recited in claim 12, the further improvement comprising:
said skegs being formed with small holes along their lower edges.

14. In a surface effect vehicle as recited in claim 1, the further improvement comprising:
said skirt being a single curvature surface formed from a flat flexible sheet.

15. In a surface effect vehicle as recited in claim 14, the further improvement comprising:
said skirt being a section of a conic surface at its front.

16. In a surface effect vehicle as recited in claim 14, the further improvement comprising:
said skirt being a section of a rhomboidal cylindrical surface at its front.

17. In a surface effect vehicle as recited in claim 1, the further improvement comprising:
said planing hulls being formed with planing surfaces stepped along the length of said hulls.

18. In a surface effect vehicle as recited in claim 17, the further improvement comprising:
ports in said planing hulls allowing communication of said air cushion with said stepped planing surfaces.

19. In a surface effect vehicle as recited in claim 1, the further improvement comprising:
said planing hulls having planing surfaces whose dead rise angle with the horizontal decreases toward the rear of the hulls.

20. In a surface effect vehicle as recited in claim 1, the further improvement comprising:
said skirt being formed of a plurality of separate leaves overlaying each other, the forwardmost leaf being held in by its curvature.

21. In a surface effect vehicle having a body planform with a source of air pressure in communication with its underside to provide lift for said body planform by reaction with a liquid surface, the improvement comprising:
a pair of hulls, each having a center of hydrodynamic lift, attached to said body planform on its sides essentially at its midpoint and extending aft; and
a flexible skirt attached to said body planform forward of said hulls, forming with said hulls sealing means for an air cushion supporting said body planform, wherein the center of pressure of said air cushion forms a triangle of support with said centers of lift encompassing the center of gravity of said vehicle.

No references cited.

SAMUEL FEINBERG, Primary Examiner

G. H. GLANZMAN, Assistant Examiner